No. 893,350. PATENTED JULY 14, 1908.
J. W. MYERS.
CURRENT MOTOR.
APPLICATION FILED JAN. 8, 1906. RENEWED MAY 21, 1908.

7 SHEETS—SHEET 1.

Witnesses

Inventor
James W. Myers
by H. B. Willson
Attorney

No. 893,350. PATENTED JULY 14, 1908.
J. W. MYERS.
CURRENT MOTOR.
APPLICATION FILED JAN. 8, 1906. RENEWED MAY 21, 1908.

7 SHEETS—SHEET 3.

Witnesses
J. L. Jenkins
C. N. Griesbauer

Inventor
James W. Myers
by H. B. Willson
Attorney

No. 893,350.

J. W. MYERS.
CURRENT MOTOR.
APPLICATION FILED JAN. 8, 1906. RENEWED MAY 21, 1908.

PATENTED JULY 14, 1908.

7 SHEETS—SHEET 6.

No. 893,350.  PATENTED JULY 14, 1908.
J. W. MYERS.
CURRENT MOTOR.
APPLICATION FILED JAN. 8, 1906. RENEWED MAY 21, 1908.

7 SHEETS—SHEET 7.

Witnesses

Inventor
James W. Myers
by H. B. Willson
Attorney

UNITED STATES PATENT OFFICE.

JAMES W. MYERS, OF VINCENNES, INDIANA, ASSIGNOR OF ONE-HALF TO PERRY MILLER, OF VINCENNES, INDIANA.

CURRENT-MOTOR.

No. 893,350.  Specification of Letters Patent.  Patented July 14, 1908.

Application filed January 8, 1906, Serial No. 295,121. Renewed May 21, 1908. Serial No. 434,165.

*To all whom it may concern:*

Be it known that I, JAMES W. MYERS, a citizen of the United States, residing at Vincennes, in the county of Knox and State of Indiana, have invented certain new and useful Improvements in Current-Motors; and I do declare the following to be a full, clear, and exact description of the invention, such as will enable other skilled in the art to which it appertains to make and use the same.

This invention relates to improvements in current motors.

The object of the invention is to provide a motor of this character adapted to be supported upon floats whereby the same will rise and fall with the tide, means being provided whereby the water wheel in said motor may be adjusted, thereby raising and lowering the same in the water to a greater or less degree or to raise the same entirely above the water.

A further object is to provide a device of this character having means whereby the current of the water may be directed in all directions upon the working side of the wheel, thereby increasing the power and speed of the latter.

With the above and other objects in view, the invention consists of certain novel features of construction, combination and arrangement of parts, as will be hereinafter described and claimed.

Figure 1:
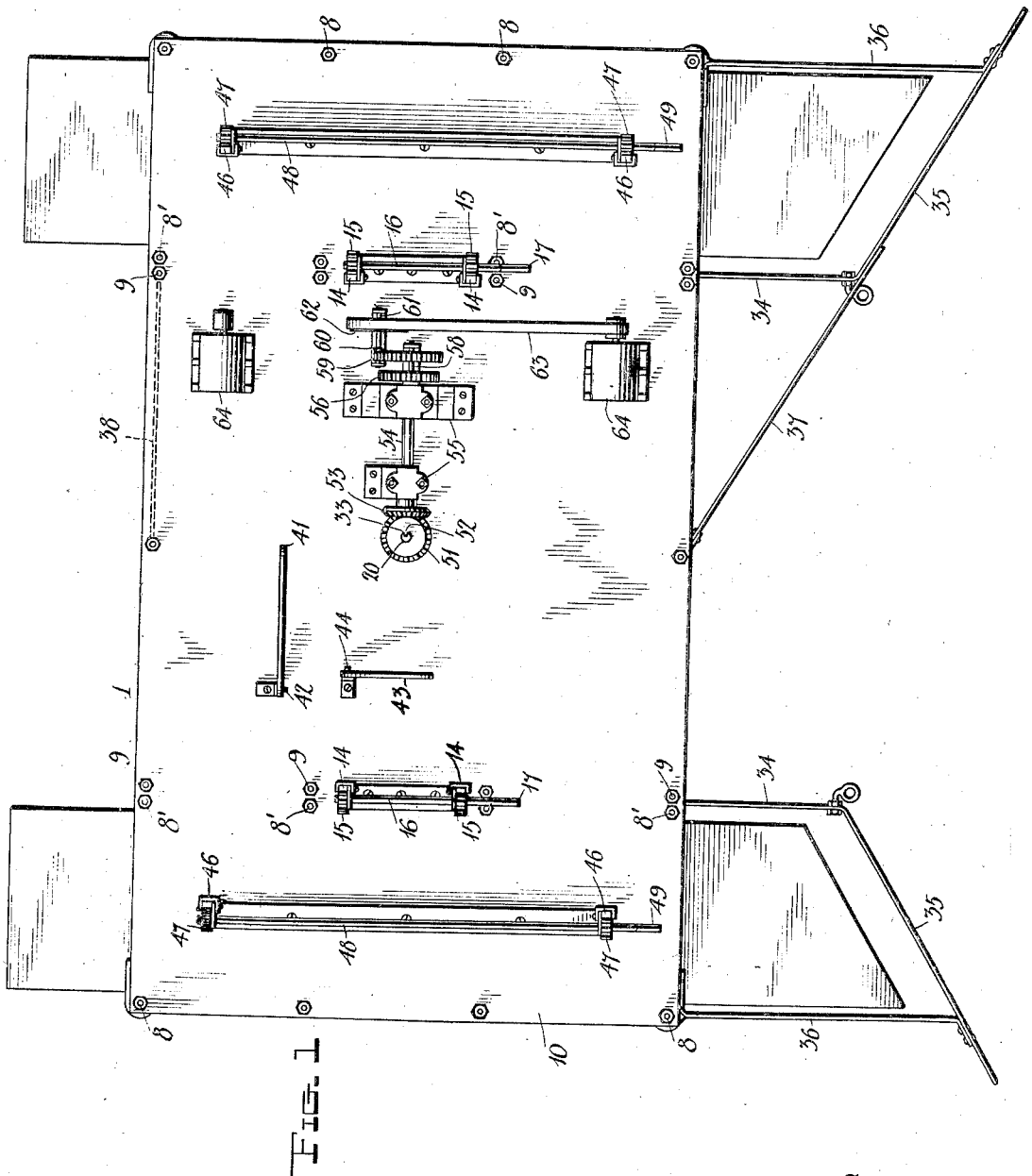
Figure 2:
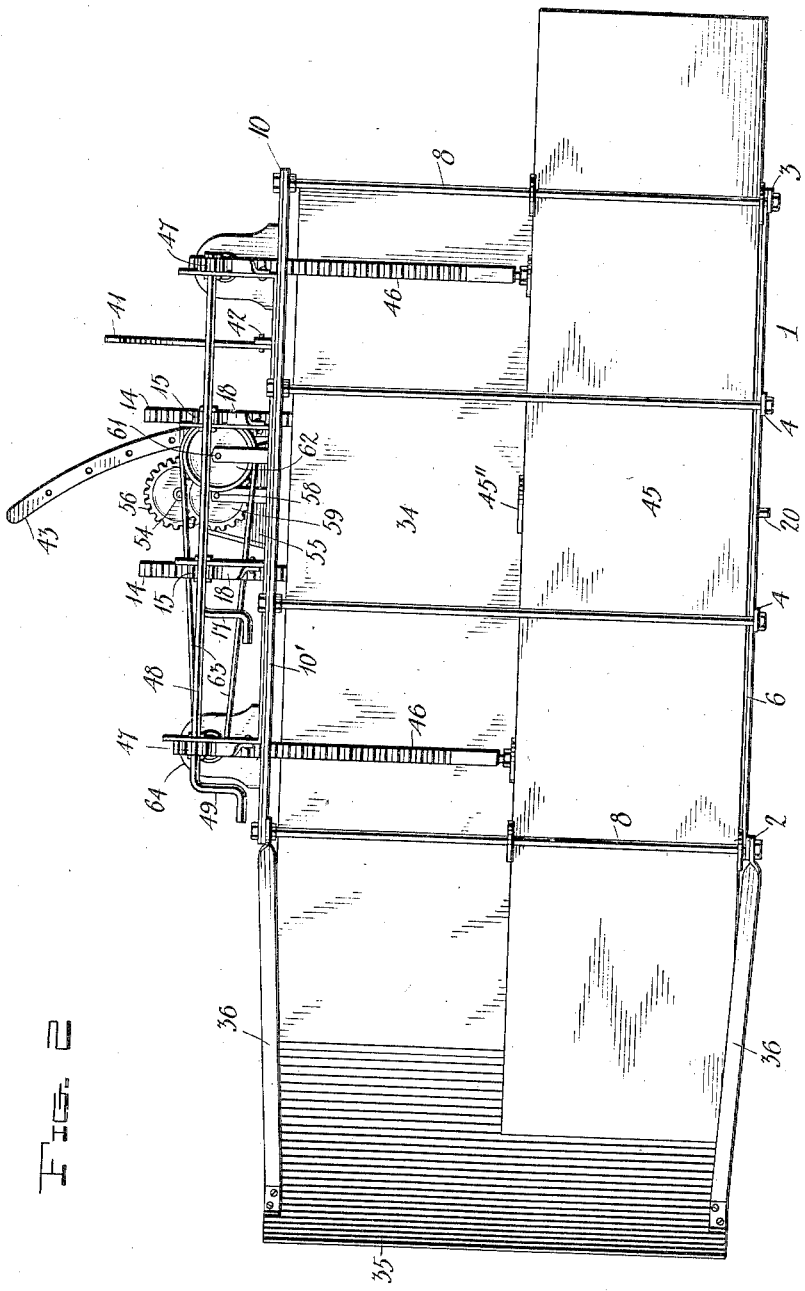
Figure 3:
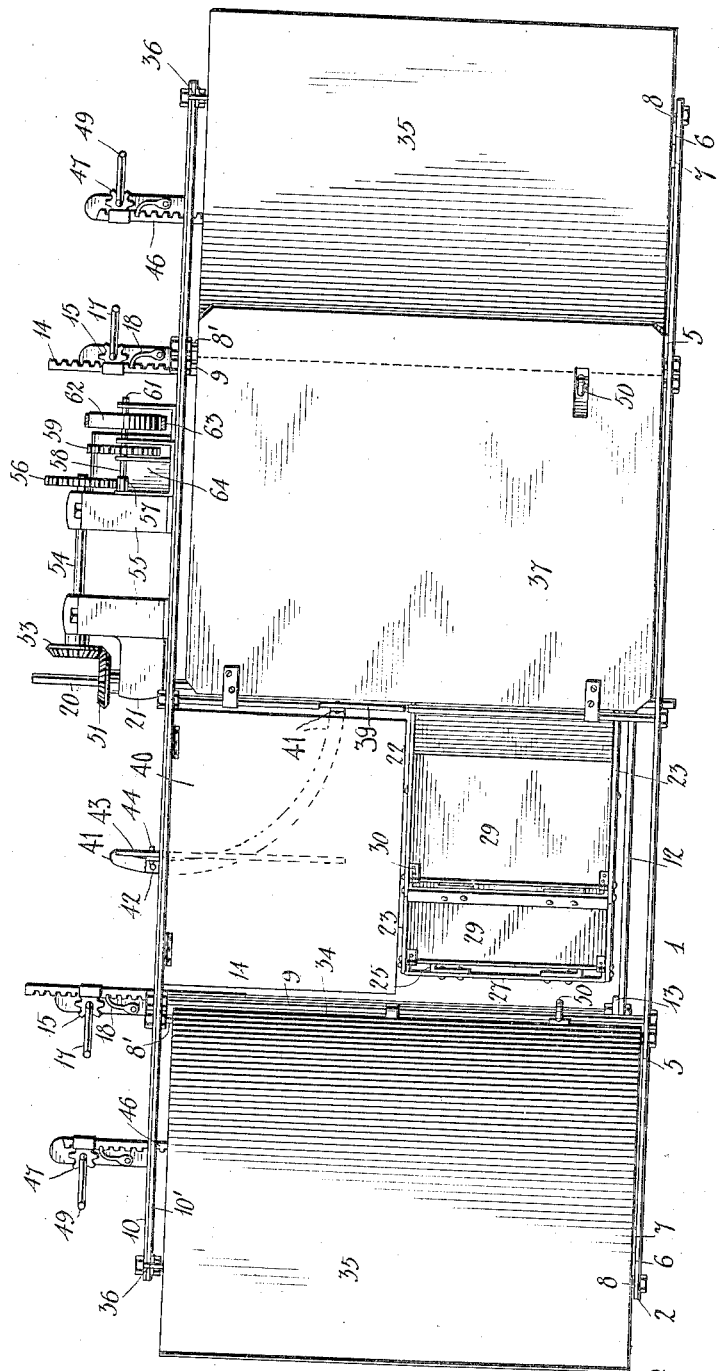
Figure 4:
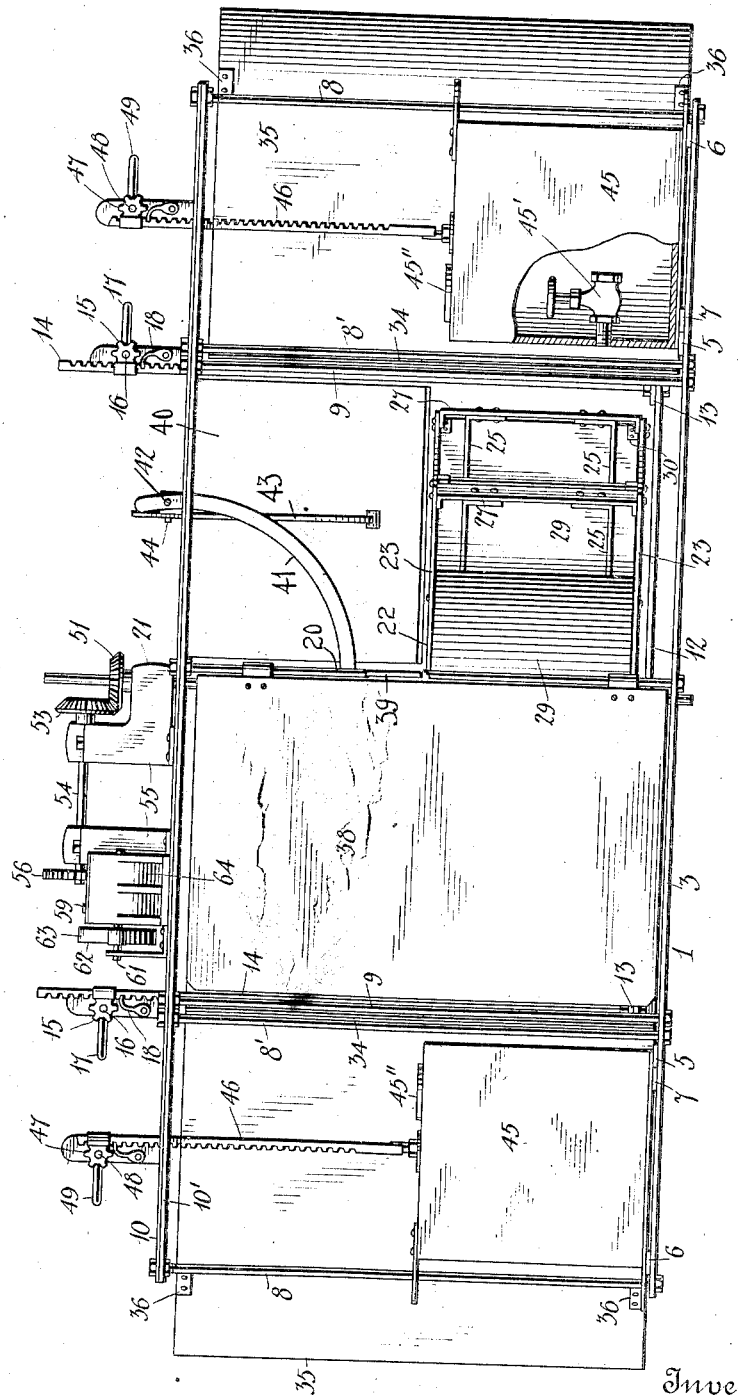
Figure 5:
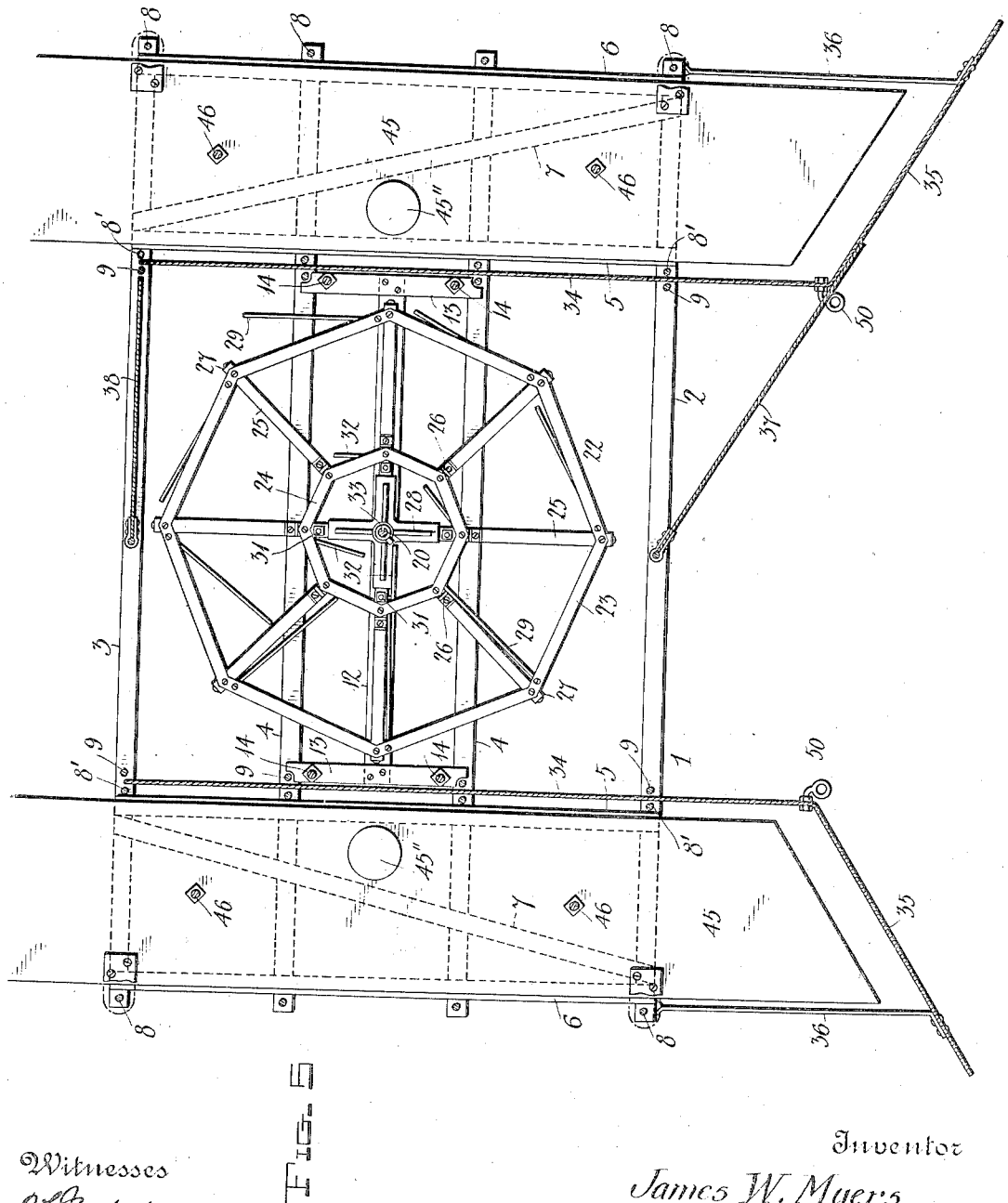
Figure 6:
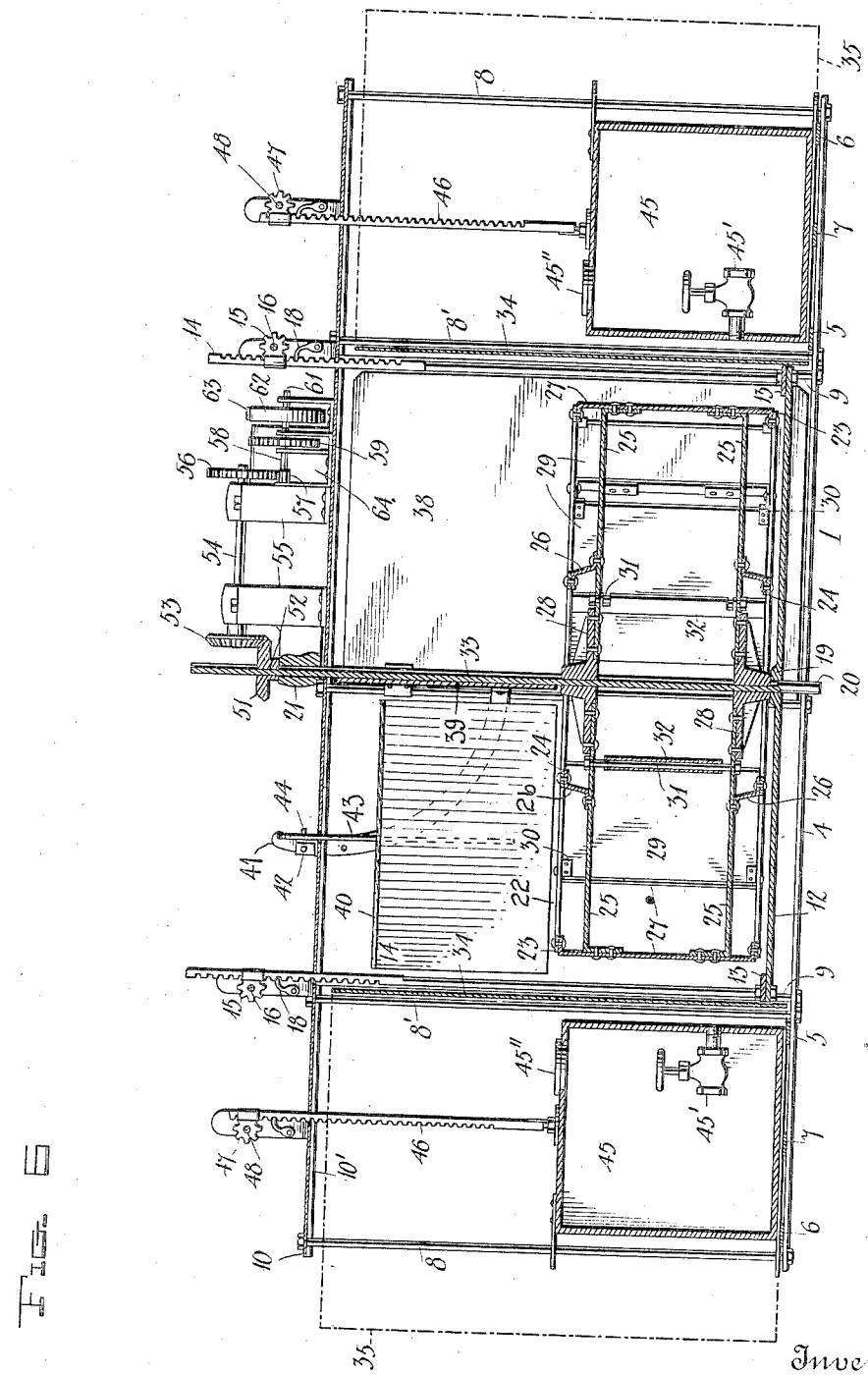
Figure 7:
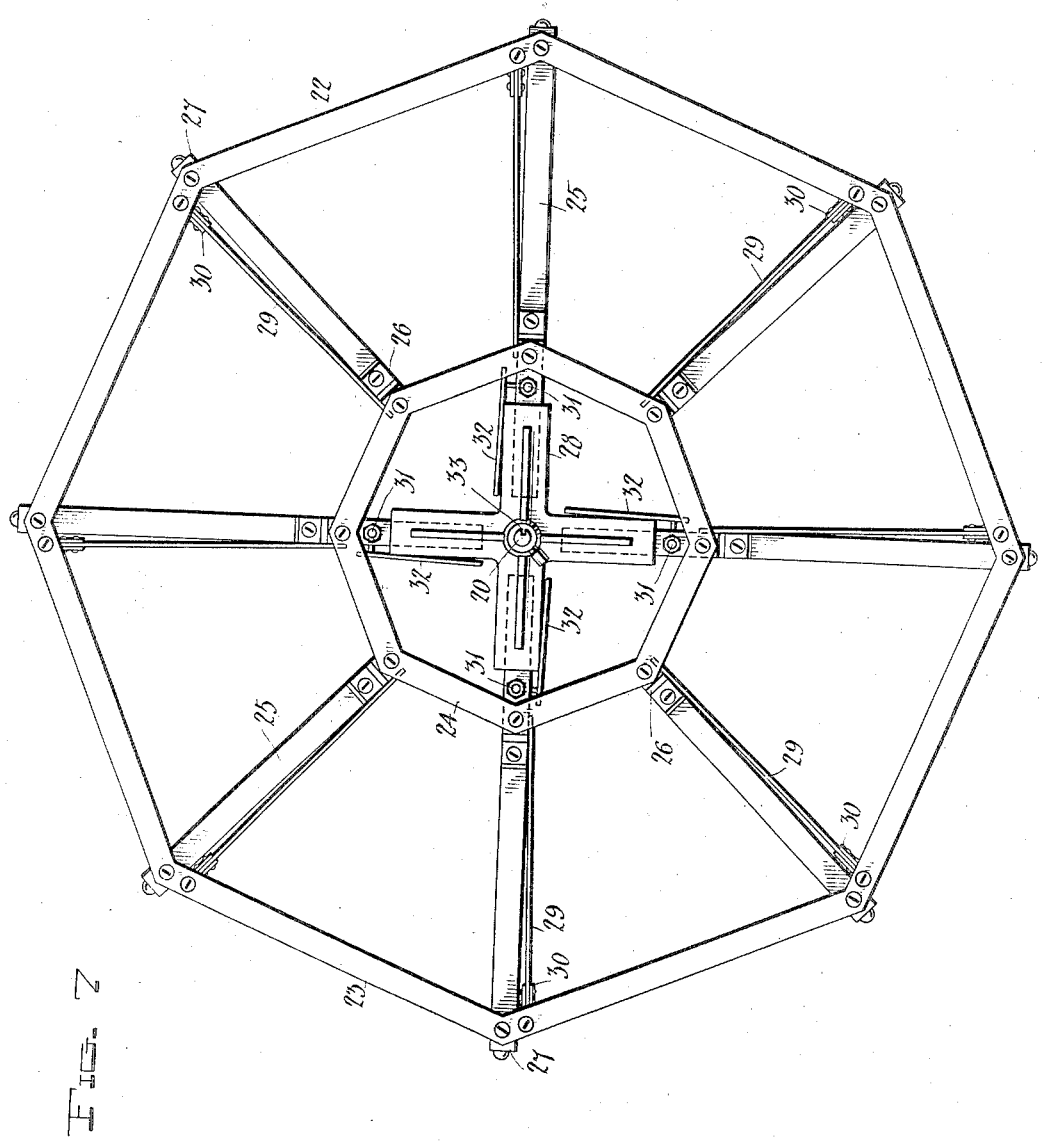

In the accompanying drawings:—Figure 1 is a top plan view of a current motor constructed in accordance with the invention; Fig. 2 is a side elevation; Fig. 3 is a front elevation; Fig. 4 is a rear elevation, parts of the same being broken away; Fig. 5 is a horizontal sectional view, taken immediately above the water wheel; Fig. 6 is a vertical, cross sectional view through the motor, taken on a line with the shaft of the water wheel; Fig. 7 is an enlarged detail plan view of the water wheel removed from the frame-work of the motor.

Referring more particularly to the drawings, 1 denotes the supporting frame of the motor, said frame consisting of a lower portion or bottom formed of front and rear parallel, longitudinally disposed, bars 2 and 3 between which are arranged parallel, transversely disposed, intermediate bars 4. The bars 2, 3 and 4 are connected at each end by inner and outer longitudinally disposed, parallel bars 5 and 6 and by obliquely disposed bars 7 arranged between the bars 5 and 6 at each side of the frame. Secured at their lower ends to the cross bars 2, 3 and 4 adjacent to the outer ends thereof, are upwardly projecting standards 8, similar standards 8' and 9 being secured to said cross bars adjacent to the inner longitudinal bars 5. Upon the upper ends of the standards 8, 8' and 9 is secured a deck or platform 10.

Between the intermediate bars 4 of the lower portion of the frame is arranged a transversely disposed wheel supporting bar or truss 12, the ends of which are secured to longitudinally disposed supporting bars 13 which slidably engage the intermediate supporting standards 9 secured to the intermediate cross bars 4. To the bars 13 are secured the lower ends of vertical, upwardly projecting rack bars 14, the upper ends of which project through the deck or platform 10 and are engaged with cog wheels 15 fixedly mounted upon longitudinally disposed shafts 16 journaled in suitable bearings on the platform or deck 10. These shafts 16 are provided at one end with a crank handle 17, whereby the same and the cog wheels 15 may be turned to raise and lower the rack bars 14 and the supporting bars carried thereby. Suitable pawls 18 are arranged above the deck 10 to engage said rack bars, thereby holding the same and the supporting bars carried thereby in their adjusted positions.

In the center of the supporting bar 12 is arranged a bearing 19, Fig. 6, in which works the lower end of a water wheel shaft 20. The upper end of the latter projects through and extends above the deck or platform 10, and is journaled in a suitable bearing bracket 21 arranged on the deck or platform 10, as shown. On the shaft 20 is mounted a water wheel 22, said wheel being keyed to the shaft 20 to turn therewith and to slide vertically thereon. The water wheel 22 may be of any suitable form and construction, and is here shown and is preferably formed in an octagonal shape, and consists of upper and lower outside octagonal frames 23 and upper and lower inside octagonal frames 24. Secured to and projecting inwardly from the upper and lower portions of uprights 27, located at the periphery of the wheel, are bars 25 that carry upwardly and downwardly projecting brackets 26, which are attached to the inner frames 24, four of the bars, in this instance, being extended to the hub of the wheel where they are secured to arms 28 projecting from the hub.

Arranged in each of the octagonal sides of the wheel frame is a blade or wing 29, said blade being pivoted at the upper and lower ends of one edge in bearing brackets 30 secured to the corners of the out side octagonal frames 23 adjacent to and at one side or the other of the vertical standards 27 which connect the upper and lower out side frames 23. The opposite or free ends of the blades 29 are adapted to engage the inner standards 26, when said blades are in an operative position, thus forming paddles against which the current of the water strikes, thereby turning said wheel. After each blade turns out of the line of the current, the same swings loosely in the brackets 30, so that no obstruction is afforded thereby on the idle or inoperative side of the wheel.

Secured to the bars 25 which project from the hub adjacent to the inner sides of the octagonal frames 24 are vertically disposed standards 31, to which are pivotally connected the inner ends of inside or auxiliary blades 32. These blades are adapted to swing loosely on said standards and when in operative position engage the arms 28 and lie in substantially the same plane with the diametrically disposed blades 29 of the outer frame. The shaft 20 of the water wheel is provided with a vertically disposed key-way or seat 33, by means of which the wheel may be raised and lowered on said shaft to any desired position within the supporting frame. By connecting the supporting bars 13 to which the truss bar 12 is connected, with the adjustable supporting bars 14 and providing cog wheels 15 to engage the latter and the crank shaft to operate said cog wheels, the supporting bars 12 and 13 together with the wheel may be raised or lowered in the supporting frame. The supporting bars 13 when so raised or lowered, will slidably engage the standards 9 connecting the lower portion of the main frame with the deck or platform 10.

Secured between the lower portion of the main frame and the deck or platform 10 and extending longitudinally from the rear to a point beyond the forward end of the frame and between the supporting standards 8' and 9 are vertical partitions 34, which separate the central or wheel carrying portion of the frame to the sides thereof. The forward ends of the partitions 34 are bent laterally in opposite directions at an angle to about 45° to form diverging guide plates 35, by means of which the current is directed toward the central portion of the frame. The plates 35 are securely braced at their outer ends by upper and lower longitudinally disposed brace bars 36. Pivotally mounted between the front cross bar 2 of the lower portion of the frame and the platform or deck 10 is a vertically disposed deflector blade or gate 37, said gate being pivoted at the center of the frame and being adapted to swing in either direction, so that the outer end of the same will engage the inner end of the guide plate 35 on either side of the frame, as shown, and by means of which the current caught by the plates 35 will be directed into one side or the other of the inner portion of the frame, as shown by the arrows in Fig. 5 of the drawings.

Pivotally mounted between the rear cross bar 3 of the lower frame and the deck or platform 10 is a stop plate or gate 38. Said gate is pivoted at the center of the frame, and is adapted to be swung in one direction or the other to close the inoperative side of the central portion of the frame, thus preventing any back-acting or side currents from interfering with the inoperative side of the wheel.

Hingedly mounted on the under side of the platform or deck 10 is a central, longitudinally disposed, blade or gate 39 which extends from one end to the other of the frame, and is adapted to be swung downwardly adjacent to the upper side of the wheel, thus separating the inoperative side of the central portion of the frame above the wheel from the operating side of the same, and forming a narrow passage for the current of water above the wheel. In order to more fully obtain the benefit of the top currents of water passing above the wheel, a deflector plate 40 is provided, said deflector plate being hinged on the under side of the deck or platform adjacent to the front edge of the same. The rear end of said deflector plate is adapted to be swung downwardly adjacent to the upper side of the wheel between the longitudinal gate 39 on one side and the partition 34 on the opposite side, thereby directing the upper currents of the water downwardly into engagement with the blades of the wheel, so that the entire force of the currents passing through the frame will be concentrated and directed to the working side of the wheel, as will be understood. By hinging the partition forming gate 39 and deflector plate 40, the same may be swung upwardly adjacent to the under side of the platform or deck, thereby permitting the water wheel to be raised or lowered when desired. In order to hold the gate 39 in raised or lowered position, said gate is provided with an upwardly curved segmental bar 41 which is adapted to work through a slot formed in the platform or deck 10 and to be engaged by a suitable pawl or locking pin 42 engaged with one of a series of apertures formed in said bar, thereby holding said gate in its adjusted position. The deflector plate 40 is provided with a similar segmental bar 43 which is adapted to work through a slot in the platform or deck 10 and to be engaged by a suitable pawl or locking pin 44 engaged with one of a series of locking recesses or apertures formed in said segmental bar, thereby holding said deflector plate in a raised or other adjusted position.

In each side of the frame between the outer standards 8 and the inner standards 8' is arranged a longitudinally disposed hollow float 45. Said floats are preferably connected to the lower ends of front and rear upwardly projecting rack bars 46 which project through the platform or deck 10 and are adapted to be engaged by cog wheels 47 mounted upon longitudinally disposed shafts 48 which are journaled in suitable bearings on the deck or platform 10, as shown. The shafts 48 are provided on one end with crank handles 49, whereby the same and the cog wheels 47 may be turned to raise and lower the rack bars 46 and the floats 45 secured to the lower ends thereof. The floats 45 are preferably in the form of hollow oblong metallic boxes of such length as to project beyond the front and rear ends of the supporting frame, as shown. The forward ends of said boxes are arranged obliquely at an angle corresponding to the angle of the deflector plates 35 at one end of the frame. By means of the rack bars 46 and the gears connected therewith the floats may be raised and lowered to any desired position in the frame of the motor. Secured to the forward ends of the partition plates 34 adjacent to their connection with the deflector plates 35 are eyebolts 50, by means of which the motor frame may be connected to suitable anchors to hold the same in line with the current of the stream in which the motor is placed. Within each of the floats is arranged a valve 45' which is adapted to be opened through a hand hole 45" in the top of the floats to let water into the latter, thus causing the floats and frame to sink more or less deeply into the water.

Arranged on the upper end of the shaft 20 is a horizontally disposed bevel gear 51, said gear being keyed to the shaft by means of a key 52, the upper and lower ends of which are offset above and below the gear to hold said key in place. Adapted to be engaged with the beveled gear 51 is a similar vertically disposed gear 53, said gear being mounted on the end of a horizontally disposed shaft 54 journaled in suitable bearings 55 on the deck or platform of the motor. On the opposite end of the shaft 54 is mounted a spur gear 56 which meshes with a pinion 57 mounted on the end of a counter shaft 58, on the opposite end of which is mounted a spur gear wheel 59 which meshes with a second pinion 60 on the end of a second counter shaft 61. Said latter shaft has mounted thereon a balance wheel or pulley 62, which is connected by a belt or other medium 63 to a dynamo 64 arranged on the deck or platform of the frame and by means of which electricity may be generated and conducted from the dynamo by wires leading to the shore and to such points where it is desired to utilize the power. By providing a train of multiplying gears connected with the drive shaft 54, the motion derived from the shaft of the water wheel will be greatly increased; and while I have shown the power of the water wheel as applied to a dynamo, it is obvious that the same may be utilized in any suitable manner. The deck or platform 10 is preferably secured to angle-iron cross bars 10' secured to the upper ends of the vertical standards 8, 8' and 9.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. In a current motor, a water wheel, an inner and outer series of radially-disposed, pivoted blades arranged in said wheel, means to raise and lower the wheel, longitudinally-disposed partitions arranged in the frame to form a water wheel compartment, and an adjustable blade or gate arranged above the wheel to separate the compartment into operative and inoperative sides.

2. In a current motor, the combination with a frame, of a water wheel arranged therein, an inner and outer series of radially-disposed, pivoted blades arranged in said wheel, means to raise and lower the wheel, longitudinally-disposed partitions arranged in the said frame to form a water wheel compartment, an adjustable blade or gate arranged above said wheel to separate the compartment into operative and inoperative sides, means to direct the currents of the stream into said operative side, and means to direct the upper currents down onto the wheel.

3. In a current motor, the combination with a floating frame, of a water wheel revolubly mounted therein, an inner and an outer series of radially disposed pivoted blades arranged in said wheel, means to raise and lower said wheel, longitudinally disposed partitions arranged in said frame to form a water wheel compartment, an adjustable blade or gate arranged above said wheel to separate said compartment into operative and inoperative sides, means to direct the currents of the stream into said operative side, and means to direct the upper currents down onto the wheel, substantially as described.

4. In a current motor, the combination with a supporting frame, of a water wheel adjustably mounted therein, longitudinally disposed partitions arranged in said frame to form a central water wheel compartment, a longitudinally disposed hinged gate adapted to be swung down to separate said compartment into operative and inoperative sides, deflector plates arranged on the forward end of the frame, a deflector plate hinged at the center of the forward end of the frame and adapted to close one side or the other of said wheel compartment, and a gate or blade hinged at the center of the rear end of the frame to close one side or the other of the rear end of said wheel compartment, substantially as described.

5. In a current motor, the combination with a main floating, supporting frame having arranged thereon a deck or platform, of a water wheel supporting frame arranged therein, vertically disposed rack bars connected to said latter frame, operating gears connected to said rack bars whereby the same and said frame are raised and lowered, a water wheel shaft journaled in said frame and projecting above said deck, a water wheel slidably mounted on said shaft to turn the latter, inner and outer series of feathering blades arranged in said wheel, a bevel gear mounted on said shaft, and a train of multiplying gears connected with said bevel gear wheel, substantially as described.

6. In a current motor, the combination with a supporting frame, of a water wheel adjustably mounted therein, a train of multiplying gears connected to the shaft of and driven by said wheel, means arranged in said frame to direct the current onto the working side of said wheel, hollow-floats arranged in said frame, rack bars connected to said floats, gears to engage said rack bars, and crank shafts to operate said gears and thereby raise and lower said floats, substantially as described.

7. In a current motor, the combination with a supporting frame, of a water wheel adjustably mounted therein, a train of multiplying gears connected to the shaft of and driven by said wheel, means arranged in said frame to direct the current onto the working side of said wheel, hollow floats arranged in said frame, rack bars connected to said floats, gears to engage said rack bars, crank shafts to operate said gears and thereby raise and lower said floats, and valves arranged in said floats to let water into the same, substantially as described.

8. In a current motor, the combination of a main supporting frame comprising lower longitudinal and transversely disposed horizontal bars having secured thereto upwardly projecting standards on the upper ends of which is secured a deck or platform, of longitudinally disposed vertical partitions arranged between said lower bars and said deck to form a central water wheel compartment, a water wheel arranged therein, stationary diverging deflector plates arranged at the front end of said compartment, a vertical longitudinally disposed plate or gate hinged to the under side of said platform to divide said compartment into operative and inoperative sides, a centrally hinged front deflector plate or gate to close the inoperative side and direct the current into the operative side of said compartment, a centrally hinged, rear plate or gate to close the rear end of said inoperative side, a transversely disposed plate hinged to the under side of said deck and adapted to be let down obliquely across said operative side to direct upper currents onto the working side of the wheel, segmental supporting bars connected to said transverse and longitudinally disposed hinged plates or gates, locking pawls to engage said bars and hold said plates in adjusted positions, floats to support said frame and wheel, and means whereby the frame may be connected to a suitable anchorage, substantially as described.

9. In a current motor, the combination with a main floating supporting frame, of a water wheel adjustably mounted therein, said wheel consisting of inner and outer, upper and lower frames, said outer frames being supported one above the other by vertically disposed standards, an outer series of blades pivotally mounted at one end between said outer, upper and lower frames, upper and lower hubs having radial arms, radial bars connecting said vertical standards with the radial arms of said hubs, brackets connecting said radial bars with said inner frames an inner series of blades hinged to swing between said connecting radial bars, a vertically disposed shaft journaled in said frame upon which said wheel is slidably mounted, means for directing the current of water onto the working side of the wheel, and floats for supporting the frame.

10. In a current motor, the combination with a main floating supporting frame, of a water wheel adjustably mounted therein, said wheel consisting of inner and outer, upper and lower frames, radially disposed bars, connected with said outer frames brackets connected with said bars and with said inner frames, said outer frames being supported one upon the other by vertically disposed standards, an outer series of blades pivotally mounted at one edge between said outer, upper and lower frames, upper and lower hubs having radial arms connected to said upper and lower bracket-carrying arms, an inner series of blades hinged to swing between said bracket-carrying arms, a vertically disposed shaft journaled in said frame upon which said wheel is slidably mounted, means to direct the current of water to the working side of the wheel, adjustable hollow floats to support said frame, valves arranged in said floats to let water into the same, and a train of multiplying gears connected to said shaft.

In testimony whereof I have hereunto set my hand in presence of two subscribing witnesses.

JAMES W. MYERS.

Witnesses:
  WILLIAM C. JOHNSON,
  WILLIAM B. ROBINSON.